United States Patent [19]

Thorson

[11] 4,241,341

[45] Dec. 23, 1980

[54] APPARATUS FOR SCAN CONVERSION

[76] Inventor: Mark R. Thorson, 12991 Pierce Rd., Saratoga, Calif. 95070

[21] Appl. No.: 17,396

[22] Filed: Mar. 5, 1979

[51] Int. Cl.[3] .............................................. G06F 3/153

[52] U.S. Cl. .................................... 340/744; 340/747; 340/799

[58] Field of Search ................ 340/732, 744, 745, 747

[56] References Cited

U.S. PATENT DOCUMENTS

| | | | |
|---|---|---|---|
| 3,725,723 | 4/1973 | Colston et al. | 340/747 X |
| 3,792,464 | 2/1974 | Hamada et al. | 340/747 |
| 3,812,491 | 5/1974 | Barraclough et al. | 340/747 |
| 3,870,922 | 3/1975 | Shutoh | 340/747 X |
| 3,891,982 | 6/1975 | Cheek et al. | 340/747 |
| 3,893,075 | 7/1975 | Orban et al. | 340/747 X |
| 3,925,776 | 12/1975 | Swallow | 340/703 |
| 3,996,585 | 12/1976 | Hogan et al. | 340/747 |

OTHER PUBLICATIONS

Lindner, "A Processor for Real Time TV Raster Scan Conversion", Computer & Graphics, vol. 4, pp. 23–28, 1979.

*Primary Examiner*—David L. Trafton
*Attorney, Agent, or Firm*—Limbach, Limbach & Sutton

[57] ABSTRACT

In the field of raster scan computer graphics display equipment, an apparatus for the transformation of picture information specified as line segments defined in terms of a two dimensional planar coordinate system describing the display raster into a form convenient for display on said raster, wherein for each scan line to be displayed the appearance thereof being determined by passing pieces of information describing line segments together composing the picture from a display file memory, sending them through a display processor to calculate the positions at which they cross the scan line, and placing the resulting pieces of information in a scan line buffer memory ordered by their precedence in the display of the scan line, during the display of a previously calculated scan line.

8 Claims, 7 Drawing Figures

APPARATUS FOR SCAN CONVERSION

BACKGROUND OF THE INVENTION

This invention relates generally to the field of computer graphics, and relates more particularly to an apparatus for scan conversion, the conversion of information describing a picture from a compressed form easily produced by a computer to an expanded form easily displayed by a raster scan device.

While applicable to other raster scan devices, this invention is primarily directed towards cathode ray tube display equipment. The cathode ray tube displays used for computer graphics may be divided into two basic catagories, calligraphic displays and raster scan displays.

Calligraphic displays are devices in which the electron beam scans an arbitrary pattern. Typically, these devices consist of a display file memory containing pieces of information describing a picture passed to a display processor, which calculates the positioning signals for the cathode ray tube display. Pictures are formed by the path travelled by the electron beam.

Raster scan displays are devices in which the electron beam scans a predefined pattern of scan lines. Typically, these devices consist of a display file memory containing pieces of information describing a picture passed to a display processor, which calculates pieces of information describing positions on the display raster collected in a frame buffer memory. The frame buffer memory is a random access storage device containing separate pieces of information corresponding to the attributes, such as intensity, color, and saturation, of positions defined on the display raster. These pieces of information are accessed in synchrony with the scan of the display to deliver the information describing the attributes of the screen as it is required. Pictures are formed by the variation of the attributes of the screen.

A general discussion of computer graphics displays may be obtained by referring to the article entitled "Computer Displays" by I. E. Sutherland, appearing in *Scientific American*, June 1970, page 57.

While possessing the ability to display shaded and colored pictures on low cost displays, raster scan displays have not generally been favored for computer graphics due to the high cost of sufficient storage to serve as a frame buffer memory and the extreme latency involved in transferring changes made in the display file memory to the frame buffer memory. These drawbacks to raster scan displays are purely the consequence of the use of the frame buffer memory, rather than an inherent quality of raster scan displays. To operate a raster scan display without the use of a frame buffer memory requires finding a means to perform the scan conversion at the rate of the scan of the display.

Detailed examples of computer graphics systems employing raster scan displays without the use of a frame buffer memory are given in the following U.S. Pat. Nos.: 3,812,491—Barraclough, et al (1974), 3,893,075—Orban, et al (1975), and 3,996,585—Hogan, et al (1976). Of a similar construction to conventional raster scan computer graphics systems using a frame buffer memory, these devices consist of a display file memory passing pieces of information describing a picture to a display processor, which calculates pieces of information describing positions on the scan line collected in a scan line buffer memory. The scan line buffer memory is a random access storage device containing separate pieces of information corresponding to the attributes of positions defined on the scan line. Since the display processor must now examine those pieces of information in the display file memory contributing to the appearance of the scan line at least once to determine the appearance of that scan line, rather than once for the display of the screen, it must operate at a very high rate. In the prior art, this requirement was accomodated by incorporating a display processor designed to operate on consecutive scan lines. This restriction permitted the retention of pieces of information describing the previous scan line. By merely calculating the incremental changes to this information, the display processor is able to operate at the rate required. Unfortunately, modification of the information in the display file memory must only occur when no pieces of information are being retained, for the display to accurately reflect the picture described by the pieces of information in the display file memory. Ordinarily, this situation will only occur during a short period between the successive displays of the screen. This imposes a significant limitation on the time available for modification of the pieces of information in the display file memory.

Although other examples of computer graphics systems employing raster scan displays without the use of a frame buffer memory exist, systems of the form of a display file memory passing pieces of information describing a picture to a display processor, which calculates pieces of information describing positions on the scan line collected in a scan line buffer memory enjoy considerable advantages in terms of cost effectiveness and high performance over competitive systems.

Therefore, it is a principle object of the present invention to provide an apparatus for scan conversion that is cost effective and of high performance, yet allows greater accessibility for the acceptance of picture information.

It is another object of the present invention to eliminate the cost of a supplemental memory to retain pieces of information describing the previous scan line.

SUMMARY OF THE INVENTION

These and additional objects are accomplished by the present invention, comprising, in summary, a display file memory, a display processor, and a scan line buffer memory.

The display file memory is a storage device for pieces of information describing line segments together composing the picture. For each scan line to be displayed, some number of these pieces of information are passed to the display processor.

The display processor is a calculating device for the calculation of the position on a scan line crossed by a line segment, given both the position of the scan line and the description of the line segment. By performing the calculation directly from this information, the display processor is released from the restriction of operating on consecutive scan lines. For the pieces of information passed by the display file memory, the positions on the scan line crossed by line segments are calculated. The line segments crossing these positions are also known, so any attributes associated with a line segment may be assigned to the position it crosses, such as its intensity, color, and saturation. This information is passed to the scan line buffer memory.

The scan line buffer memory is a storage device for pieces of information describing positions on the scan line. For each position crossed by a line segment identified by the display processor, the attributes associated with that line segment are placed in the piece of information in the scan line buffer memory describing that position on the scan line. In this manner, the pieces of information describing the appearance of the scan line are collected in the scan line buffer memory, placing them in the order in which they are displayed. By accessing the information in the scan line buffer memory sequentially beginning with the piece of information describing the first position on the scan line, the information describing the attributes of the scan line is made available in the order in which it is required by the raster scan device.

By calculating successive scan lines ahead of the scan of the display, the information describing the attributes of the screen is made available continuously to the raster scan device, forming a frame from successive scan lines and forming a visible image from successive frames.

This structure of these three components operating in the described fashion provides an apparatus for scan conversion that is cost effective and of high performance, yet allows greater accessibility for the acceptance of picture information.

Other objects, advantages, and features of the various aspects of the present invention will become apparent from the following description of its preferred embodiments which should be taken in conjunction with the accompanying drawings.

DESCRIPTION OF THE PREFERRED EMBODIMENT

The purpose of this invention is to convert information describing a picture from a compressed form easily produced by a computer to an expanded form easily displayed by a raster scan device, such as a television receiver.

Figure 1:
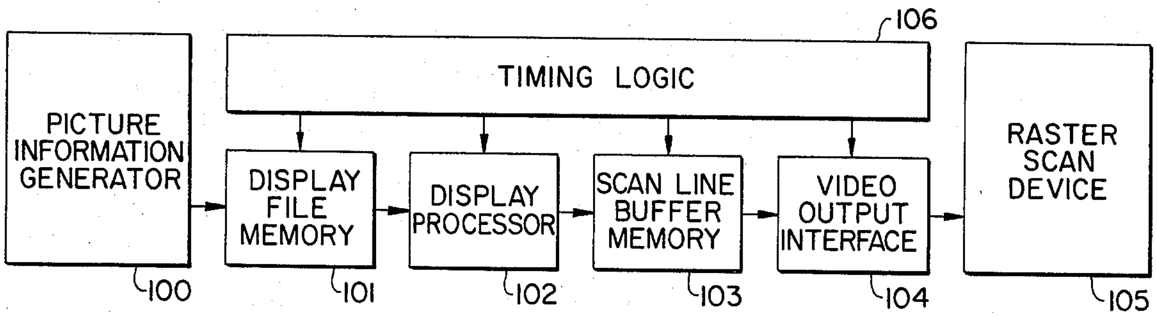
FIG. 1 is a block diagram of a system employing this invention to generate a picture on the screen of a raster scan device.

Referring initially to FIG. 1, a block diagram is shown of a system employing this invention to generate a picture on the screen of a raster scan device. The picture information generator 100, typically a computer, produces pieces of information collectively describing a picture in a compressed form. These pieces of information are collected in the display file memory 101. For each scan line to be displayed, those pieces of information describing a portion of the picture crossed by that scan line are passed to the display processor 102, to calculate their contributions to the appearance of the scan line. The resulting pieces of information are collected in the scan line buffer memory 103, placing them in the order in which they occur along the scan line. Once the complete description of the appearance of the scan line has been collected, it is sent along to the video output interface 104, so that it may be translated from its digital representation and mixed with synchronization and blanking information to form a video signal. The video signal is then passed to the raster scan device 105 for display on its screen. Control and coordination of the operation of the apparatus are performed by the timing logic 106.

Figure 2:
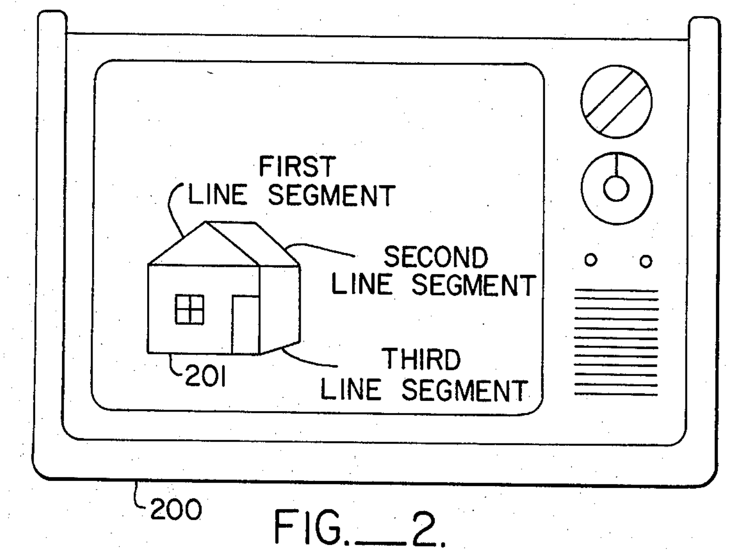
FIG. 2 is a representation of a typical raster scan device displaying a picture.

Referring to FIG. 2, a representation is shown of a typical raster scan device displaying a picture. The most common type of raster scan device is a television receiver 200 incorporating a cathode ray picture tube, however, other kinds of raster scan devices, such as ink jet printers, may also be used. The picture 201 is composed of straight line segments, in order to accommodate the compressed form in which the information describing the picture is produced. These line segments are used to define the borders of regions of the screen possessing a certain set of attributes, such as intensity, color, and saturation, although other uses of the line segments are also possible.

Figure 3:
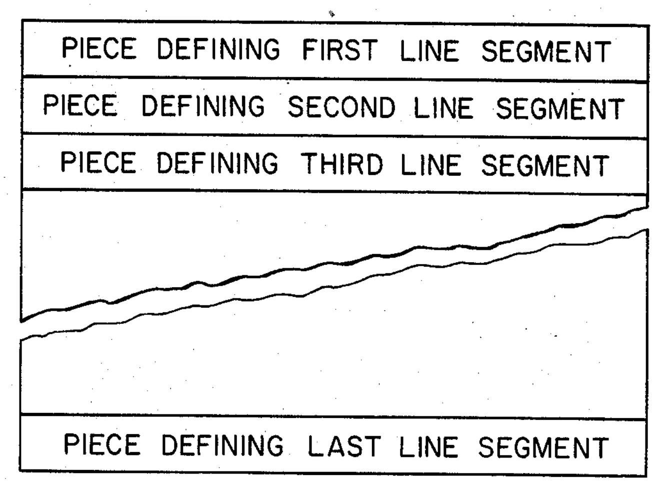
FIG. 3 is a representation of the compressed form in which the information describing a picture is defined.

Referring to FIG. 3, a representation is shown of the compressed form in which the information describing a picture is defined. The information will consist of numerous pieces, each corresponding to one of the line segments composing the picture. Each line segment is defined in terms of a two dimensional planar coordinate system describing the display raster.

Figure 4:
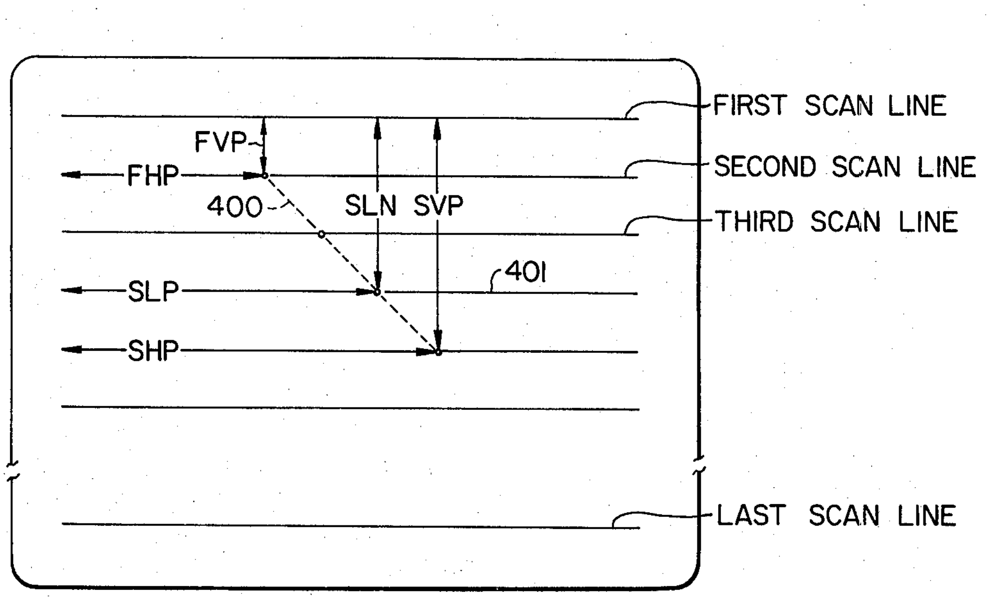
FIG. 4 is a representation of the manner in which a line segment is defined on the display raster.

Referring to FIG. 4, a representation is shown of the manner in which a line segment is defined on the display raster. The display raster consists of numerous horizontal scan lines which are displayed from left to right, beginning from the top of the screen. Positions on the display raster are defined in the horizontal dimension by the distance from the beginning of the scan line and are defined in the vertical dimension by the number of scan lines to the top of the screen. For the typical line segment 400 illustrated, its corresponding piece of information will contain: a quantity FHP describing the position of the first endpoint of the line segment 400 in the horizontal dimension, a quantity FVP describing the position of the first endpoint of the line segment 400 in the vertical dimension, a quantity SHP describing the position of the second endpoint of the line segment 400 in the horizontal dimension, and a quantity SVP describing the position of the second endpoint of the line segment 400 in the vertical dimension. Additionally, a quantity LSA describing the attributes associated with the line segment 400 is contained, such as its intensity, color, and saturation. For the typical scan line 401 illustrated, this piece of information is used with a quantity SLN describing the number of scan lines between the scan line 401 and the top of the screen to calculate a quantity SLP describing the position crossed by the line segment 400 on the scan line 401 to determine the contribution of the line segment 400 to the appearance of the scan line 401.

Figure 5:
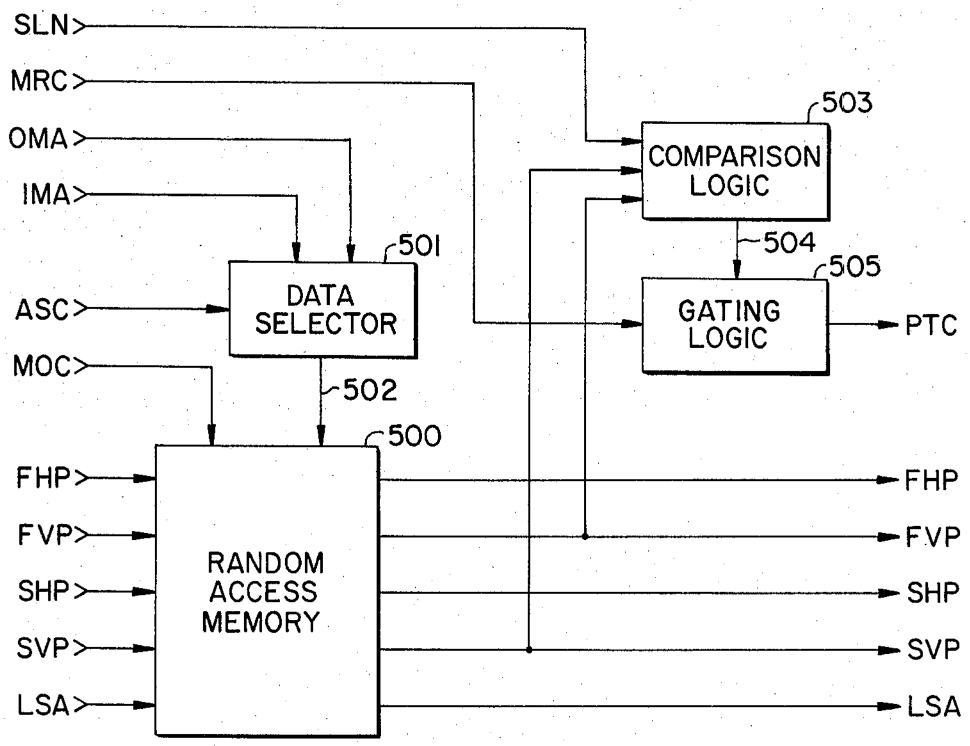
FIG. 5 is a block diagram of an implementation of the display file memory.

Referring to FIG. 5, a block diagram is shown of an implementation of the display file memory 101 (FIG. 1). A random access memory 500 is used to collect the information produced by the picture information generator 100 (FIG. 1). Individual pieces of information in the random access memory 500 are identified by their memory address. When information is being placed into the random access memory 500, the address select control ASC from the picture information generator 100

(FIG. 1) directs the data selector 501 to connect the input memory address IMA passed by the picture information generator 100 (FIG. 1) to the address input 502 of the random access memory 500. At the same time, the memory operation control MOC from the picture information generator 100 (FIG. 1) directs the random access memory 500 to accept the piece of information containing quantities FHP, FVP, SHP, SVP, and LSA passed by the picture information generator 100 (FIG. 1) into the memory address specified by the input memory address IMA. When information is being read out of the random access memory 500, the address select control ASC from the picture information generator 100 (FIG. 1) directs the data selector 501 to connect the output memory address OMA passed by the timing logic 106 (FIG. 1) to the address input 502 of the random access memory 500. At the same time, the memory operation control MOC from the picture information generator 100 (FIG. 1) directs the random access memory 500 to present the piece of information containing quantities FHP, FVP, SHP, SVP, and LSA out of the memory address specified by the output memory address OMA. For the typical scan line 401 (FIG. 4), comparison logic 503 determines whether pieces of information presented by the random access memory 500 correspond to line segments contributing to the appearance of the scan line 401 (FIG. 4). The typical line segment 400 (FIG. 4) is determined to contribute to the appearance of the scan line 401 (FIG. 4) if quantities FVP and SVP describing the vertical positions of its endpoints form a range encompassing the quantity SLN describing the position of the scan line 401 (FIG. 4) passed by the timing logic 106 (FIG. 1). The result 504 of the determination is used by gating logic 505 to modify the memory read clock MRC from the timing logic 106 (FIG. 1). The memory read clock MRC indicates the presentation of a piece of information by the random access memory 500. It is modified to form the pipeline transfer clock PTC, indicating the presentation of a piece of information describing a line segment contributing to the appearance of the scan line 401 (FIG. 4).

Figure 6:
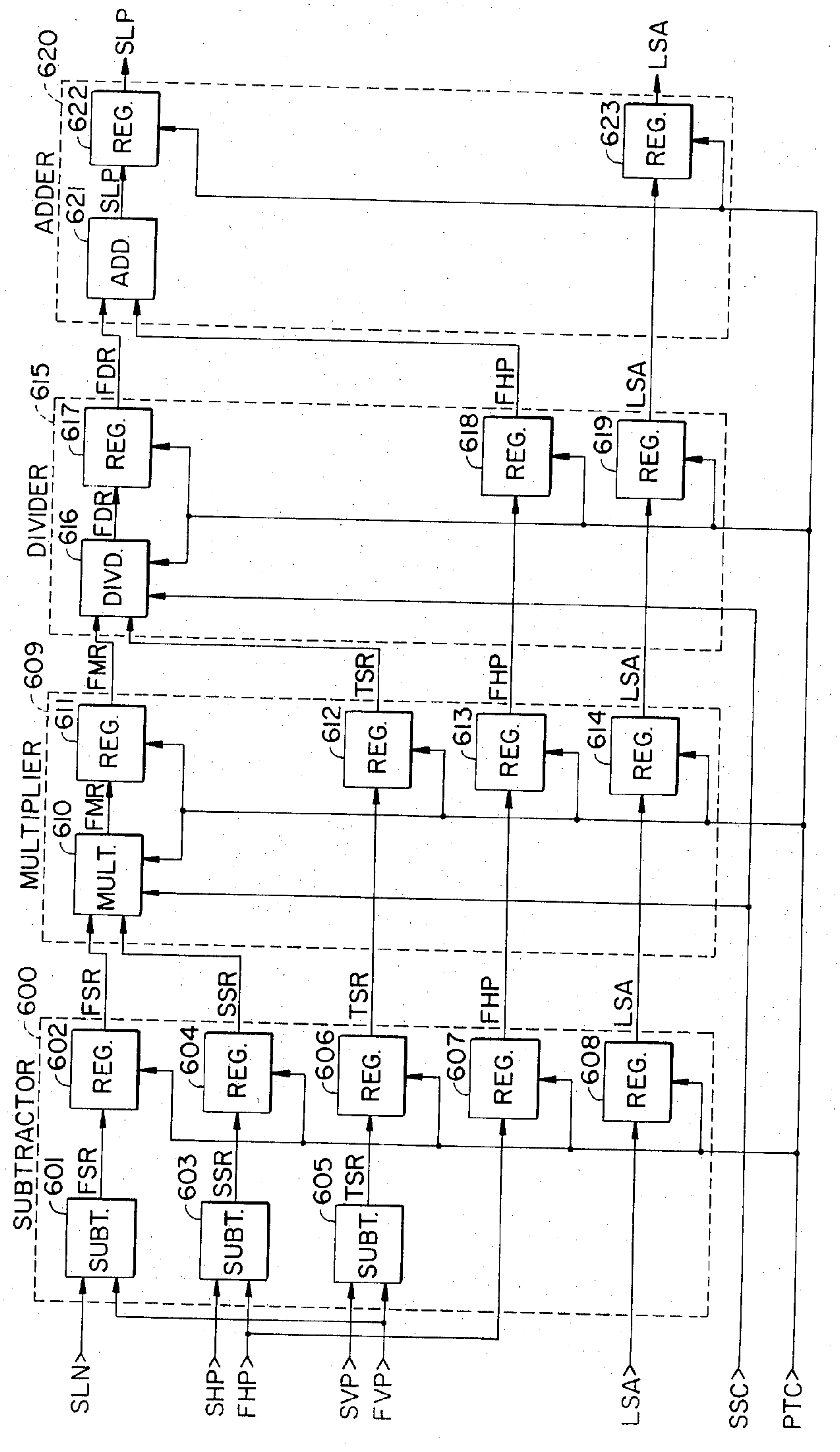
FIG. 6 is a block diagram of an implementation of the display processor.

Referring to FIG. 6, a block diagram is shown of an implementation of the display processor 102 (FIG. 1). For the typical line segment 400 (FIG. 4), the display processor 102 (FIG. 1) calculates a quantity SLP describing the position crossed by the line segment 400 (FIG. 4) on the scan line 401 (FIG. 4) to determine the contribution of the line segment 400 (FIG. 4) to the appearance of the scan line 401 (FIG. 4), given both the description of the line segment 400 (FIG. 4) and the position of the scan line 401 (FIG. 4). This is accomplished with the evaluation of $$SLP = FHP + (SLN - FVP)(SHP - FHP)/(SVP - FVP) \quad \text{(Eq. 1)}$$

by a pipelined processor, a multistage processor in which successive phases of computation operate simultaneously on separate pieces of information. Each phase of computation is performed by a separate stage of the processor containing both one, or more, processing elements and one, or more, buffer registers. Once the processing elements have performed their operation, the buffer registers hold their results and any other information that will be required by subsequent stages of the pipelined processor until an information transfer along the stages of the pipelined processor is indicated by the pipeline transfer clock PTC. In this manner, the simultaneous operation of the separate processing elements of the pipelined processor is coordinated by an external signal, although self clocked and asynchronous implementations are also possible.

The first stage of the display processor 102 (FIG. 1) performs the three subtraction operations of Equation 1. The first subtraction operation is performed by the subtraction element 601 subtracting a quantity FVP describing the vertical position of the first endpoint of the line segment 400 (FIG. 4) from a quantity SLN describing the position of the scan line 401 (FIG. 4) to form a quantity FSR describing the first subtraction result, this quantity being stored in a buffer register 602 to await transfer to the next stage of the pipelined processor. The second subtraction element 603 subtracts a quantity FHP describing the horizontal position of the first endpoint of the line segment 400 (FIG. 4) from a quantity FHP describing the horizontal position of the second endpoint of the line segment 400 (FIG. 4) to form a quantity SSR describing the second subtraction result, this quantity being stored in a buffer register 604. The third subtraction element 605 subtracts a quantity FVP describing the vertical position of the first endpoint of the line segment 400 (FIG. 4) from a quantity SVP describing the vertical position of the second endpoint of the line segment 400 (FIG. 4) to form a quantity TSR describing the third subtraction result, this quantity being stored in a buffer register 606. An additional buffer register 607 exists to pass along a quantity FHP describing the horizontal position of the first endpoint of the line segment 400 (FIG. 4) to the next stage of the pipelined processor. Similarly, a second additional buffer register 608 exists to pass along a quantity LSA describing the attributes associated with the line segment 400 (FIG. 4).

The second stage 609 of the display processor 102 (FIG. 1) performs the multiplication operation of Equation 1. This operation is performed by the multiplication element 610 multiplying a quantity FSR describing the first subtraction result by a quantity SSR describing the second subtraction result to form a quantity FMR describing the first multiplication result, this quantity being stored in a buffer register 611 to await transfer to the next stage of the pipelined processor. For a multiplication element operating by the sequential shifting of an internal register, a sequential shift clock SSC is provided. An additional buffer register 612 exists to pass along a quantity TSR describing the third subtraction result to the next stage of the pipelined processor. Similarly, a second additional buffer register 613 exists to pass along a quantity FHP describing the horizontal position of the first endpoint of the line segment 400 (FIG. 4), and a third additional buffer register exists to pass along a quantity LSA describing the attributes associated with the line segment 400 (FIG. 4).

The third stage 615 of the display processor 102 (FIG. 1) performs the division operation of Equation 1. This operation is performed by the division element 616 dividing a quantity FMR describing the first multiplication result by a quantity TSR describing the third subtraction result to form a quantity FDR describing the first division result, this quantity being stored in a buffer register 617 to await transfer to the next stage of the pipelined processor. For a division element operating by the sequential shifting of an internal register, a sequential shift clock SSC is provided. An additional buffer register 618 exists to pass along a quantity EHP describing the horizontal position of the first endpoint of the line segment 400 (FIG. 4) to the next stage of the pipelined processor. Similarly, a second additional buffer register 619 exists to pass along a quantity LSA describing the attributes associatd with the line segment 400 (FIG. 4).

The fourth and final stage of the display processor 102 (FIG. 1) performs the addition operation of Equation 1. This operation is performed by the addition element 621 adding a quantity FDR describing the first division result to a quantity FHP describing the horizontal position of the first endpoint of the line segment 400 (FIG. 4) to form a quantity SLP describing the position crossed by the line segment 400 (FIG. 4) on the scan line 401 (FIG. 4), this quantity being stored in a buffer register 622 to await transfer out of the pipelined processor. An addition buffer register 623 exists to pass along a quantity LSA describing the attributes associated with the line segment 400 (FIG. 4) out of the pipelined processor.

In this manner, the position crossed by the typical line segment 400 (FIG. 4) on the typical scan line 401 (FIG. 4) is calculated, given both the description of the line segment 400 (FIG. 4) and the position of the scan line 401 (FIG. 4). Simultaneously, the description of the attributes associated with the line segment 400 (FIG. 4) is delivered.

Figure 7:
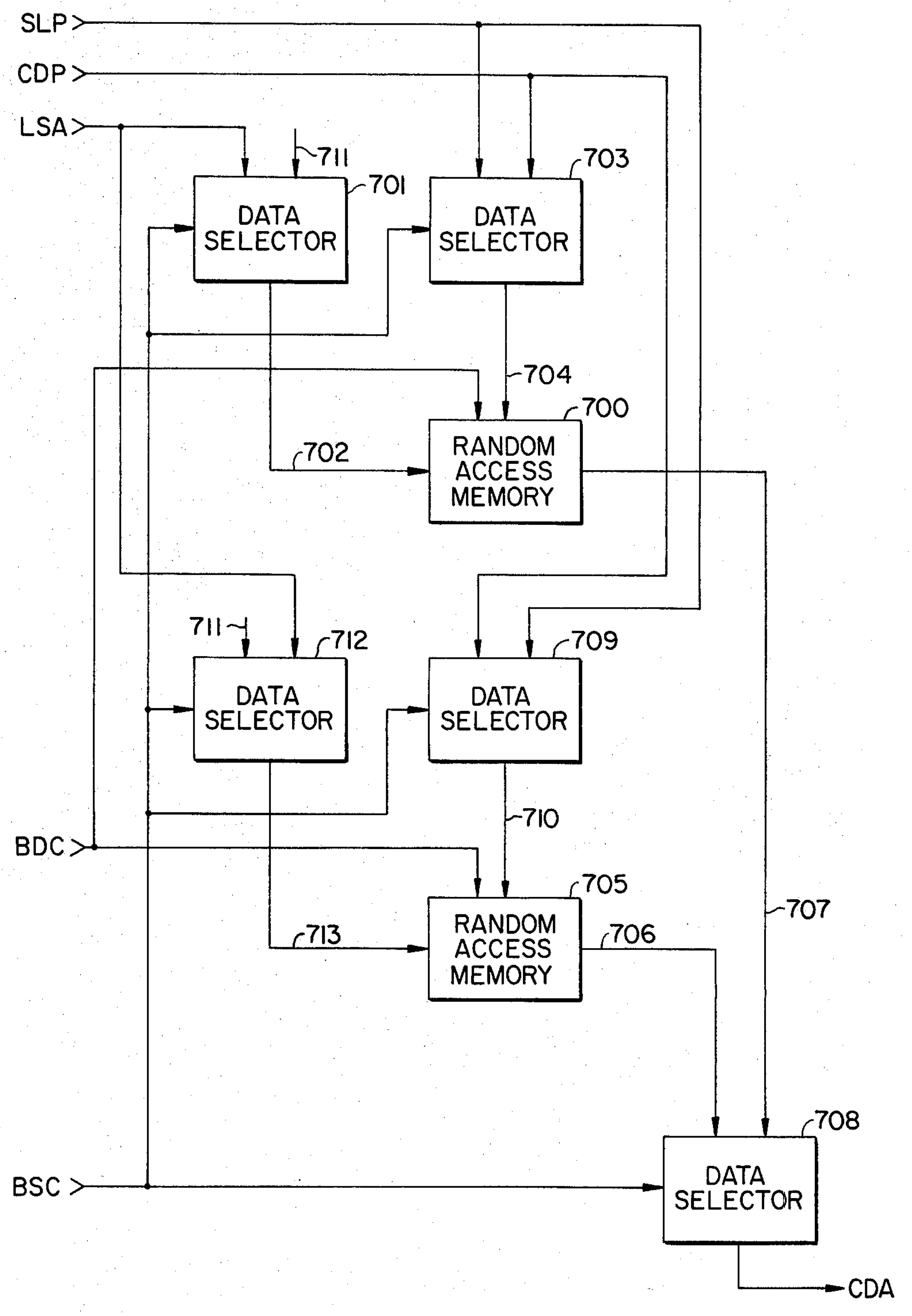
FIG. 7 is a block diagram of an implementation of the scan line buffer memory.

Referring to FIG. 7, a block diagram is shown of an implementation of the scan line buffer memory 103 (FIG. 1). For the typical scan line 401 (FIG. 4), a random access memory 700 containing individual pieces of information identified by memory addresses corresponding to the attributes of positions defined on the scan line 401 (FIG. 4) collects the pieces of information describing the appearance of the scan line, placing them in the order in which they are displayed. For the typical line segment 400 (FIG. 4), a quantity LSA describing the attributes associated with the line segment 400 (FIG. 4) is connected by a data selector 701 to the input 702 of the random access memory 700. When directed by the buffer operation control BOC from the timing logic 106 (FIG. 1), this quantity LSA is placed into the piece of information in the random access memory 700 identified by the quantity SLP describing the position crossed by the line segment 400 (FIG. 4) on the scan line 401 (FIG. 4) connected by a data selector 703 to the address input 704 of the random access memory 700. Meanwhile, a second random access memory 705 stored with pieces of information describing the appearance of a previous scan line is being accessed in synchrony with the scan of the display to deliver the information describing the attributes of the screen as it is required. The output 706 of the random access memory 705 is selected over the output 707 of the random access memory 700 as a quantity CDA describing the current display attributes by the data selector 708. Accessing of the random access memory 705 sequentially beginning with the piece of information describing the first position of the scan line is accomplished by a quantity CDP describing the current display position on the scan line passed by the timing logic 106 (FIG. 1) connected by a data selector 709 to the address input 710 of the random access memory 705. As the pieces of information in the random access memory 705 are accessed, the buffer operation control BOC from the timing logic 106 (FIG. 1) causes the pieces of information to be erased by placing null data 711 connected by a data selector 712 to the input 713 of the random access memory 705. This is to prepare the random access memory 705 to receive pieces of information describing a subsequent scan line. Alternation of the function of these memories by the data selectors occurs between every scan line in response to the buffer select control BSC from the timing logic 106 (FIG. 1), insuring the continuous operation of the scan line buffer memory 103 (FIG. 1).

Although the various aspects of the present invention have been described with respect to specific arrangements, it will be understood that the invention is entitled to protection within the full scope of the appended claims.

I claim:

1. A system for converting pieces of information, each corresponding to one of a plurality of line segments that together form a picture, into a form suitable for display on a raster scan device, comprising:

a memory capable of storing a plurality of said pieces of information, means receiving said pieces of information from said memory for calculating any points of intersection of the corresponding line segments with a particular display scan line of intersect, said calculating means operating to determine the points of intersection of the line segments described by said pieces of information with a particular scan line independently of calculations for any other scan line, and means receiving the points of intersection from said calculating means for ordering their occurrence along said scan line of interest, whereby the information is presented in a form suitable for application to a raster scan device, wherein said ordering means comprises:

a random access memory, means for sequentially reading information out of said memory and presenting the information in a form suitable for application to a raster scan device, and means receiving the points of intersection as determined by said calculating means for addressing locations of said random access memory that correspond to the points of intersection.

2. The system according to claim 1 wherein each piece of information stored within said memory includes attributes of a line segment defined by the piece of information, and wherein said random access memory stores said attribute information at an address corresponding to a point of intersection of its line segment with said particular display scan line.

3. A system for converting pieces of information, each corresponding to one of a plurality of line segments that together form a picture, into a form suitable for display on a raster scan device, comprising:

a memory capable of storing a plurality of said pieces of information, means receiving said pieces of information from said memory for calculating any points of intersection of the corresponding line segments with a particular display scan line of interest, said calculating means operating to determine the points of intersection of the line segments described by said pieces of information with a particular scan line independently of calculations for any other scan line, said calculating means additionally including a parallel processor characterized by simultaneous operation of separate processing elements on said pieces of information, and means receiving the points of intersection from said calculating means for ordering their occurrence along said scan line of interest, whereby the information is presented in a form suitable for application to a raster scan device.

4. A system for converting pieces of information, each corresponding to one of a plurality of line segments that together form a picture, into a form suitable for display on a raster scan device, comprising:

a memory capable of storing a plurality of said pieces of information, means receiving said pieces of information from said memory for calculating any point of intersection of the corresponding line segments with a particular display scan line of interest, said calculating means operating to determine the points of intersection of the line segments described by said pieces of information with a particular scan line independently of calculations for any other scan line, said calculating means additionally including a pipelined processor that is characterized by performing different arithmetical functions at the same time with different pieces of information as read from said memory, any particular piece of information being advanced in time sequence through separate processing stages of said processor, and means receiving the points of intersection from said calculating means for ordering their occurrence along said scan line of interest, whereby the information is presented in a form suitable for application to a raster scan device.

5. A system for converting pieces of information, each corresponding to one of a plurality of line segments that together form a picture, into a form suitable for display on a raster scan device, comprising:

a memory capable of storing a plurality of said pieces of information, means receiving said pieces of information from said memory for calculating any points of intersection of the corresponding line segments with a particular display scan line of interest, said calculating means including a pipelined processor that includes a plurality of separate processing stages and is characterized by each processing stage performing different arithmetical functions at the same time with different pieces of information obtained from said memory, any particular piece of information being advanced in time sequence through said separate processing stages, and means receiving the points of intersection from said calculating means for ordering their occurrence along said scan line of interest, whereby the information is presented in a form suitable for application to a raster scan device.

6. The system according to claim 5 wherein said memory is characterized by storing said plurality of pieces of information without any order, and further wherein said calculating means operates to review each piece of information within said memory while determining points of intersection with said particular display scan line of interest.

7. The system according to claim 5 wherein said ordering means comprises:

a random access memory, means for sequentially reading information out of said memory and presenting the information in a form suitable for application to a raster scan device, and means receiving the points of intersection as determined by said calculating means for addressing locations of said random access memory that correspond to the points of intersection.

8. An electronic system for converting digital picture records in the form of display line segment end point coordinates into an expanded form suitable for display on a raster scan device, comprising:

means receiving digital coded records defining said end point coordinates for storing a plurality of said records in a random manner and sufficient to form at least one frame of said graphical pattern, means operable during the time of each horizontal scan of said output device for reviewing all of the records in said storing means for said at least one frame in a manner that at a given clock time, digital information concerning both end point coordinates of a given line segment are obtained, at a second clock time, records defining a pair of end point coordinates for another line segment are obtained, and so on, filter means receiving in time sequence the records from said outputting means and a digital coded signal representative of said another scan line for discarding all pairs of records that do not define a line segment that crosses said another scan line, means receiving said records from said filter means for parallelly processing said records during the time of said given horizontal scan line in order to define all points along another scan line which are crossed by lines of said graphical pattern, thereby to permit such crossing points to be displayed when said raster scan output device traverses said another scan line, said processing means comprising:

subtracting means receiving in time sequence records from said filter means that define line segments that cross said another scan line and receiving a digital coded signal representative of said another scan line for obtaining the difference between end point coordinates of each display line in time sequence, and means receiving said differences for forming products, quotients and sums to form in time sequence output words indicative of crossings of said another horizontal scan line by said pattern, a buffer memory receiving said output words, said memory characterized by being randomly accessed for loading in accordance with addresses corresponding to the points of intersection with said another horizontal scan line, and means reading said buffer memory in a fixed sequence for developing a signal suitable for application to said raster scan display device.

* * * * *